(No Model.)
J. F. TALLANT.
PICTURE.
No. 489,343.  Patented Jan. 3, 1893.
Fig. 1.
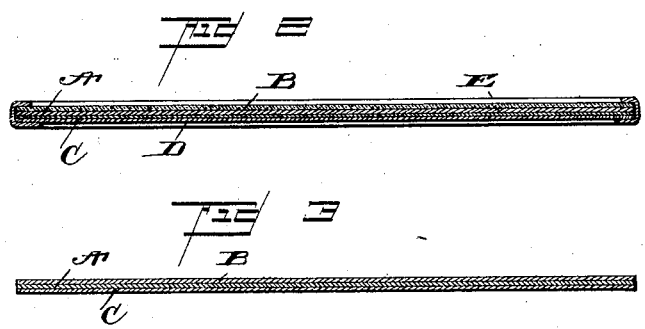
Witnesses
John Imirie
[signature]
Inventor
James F. Tallant,
By his Attorney,
J. R. Littell

UNITED STATES PATENT OFFICE.

JAMES FRANCIS TALLANT, OF CHARLESTON, SOUTH CAROLINA.

PICTURE.

SPECIFICATION forming part of Letters Patent No. 489,343, dated January 3, 1893.

Application filed November 2, 1891. Serial No. 410,650. (No model.)

*To all whom it may concern:*

Be it known that I, JAMES FRANCIS TALLANT, a citizen of the United States, residing at Charleston, in the county of Charleston and State of South Carolina, have invented certain new and useful Improvements in Mounting and Treating Pictures; and I do hereby declare that the following is a full, clear, and exact description of the invention, which will enable others skilled in the art to which it appertains to make and use the same.

This invention relates to pictures and embodies a simple and improved method of treating pictures, such as photographs, drawings, crayons, prints and the like, whereby the picture is protected against damage, and is adapted to be exhibited as in its original effect or as a transparency.

The object of the invention is to provide a picture of the class described having a transparent protective sheet covering the surface of the same and of such a nature as will not destroy the flexibility of the picture, and which will not in any manner obscure the latter or render it indistinct when viewed as an ordinary photograph or other picture.

A further object of the invention is to provide a picture of the class noted which will present its original or uncolored appearance, or as a tinted picture or transparency according to the manner of exhibiting.

In the drawings—Figure 1 is a plan view of a picture, illustrating my invention. Fig. 2 is a sectional view. Fig. 3 is a similar view in which the backing sheet is dispensed with.

Corresponding parts in the figures are denoted by the same letters of reference.

In carrying out my invention, I employ a photograph, drawing or print, printed or drawn upon a sheet of translucent material, A, such as paper or thin cardboard. Over the surface of the picture is secured by means of a suitable transparent adhesive substance a flexible protective sheet, B. For this purpose I employ a sheet of mica, though any other suitable material may be employed. It is essential, however, that this protective sheet be so transparent as to enable the picture to be at all times clearly visible through the same when viewed as an ordinary photograph or picture, and not obscure or indistinct as in the case of the ordinary transparencies.

At the rear side of the translucent sheet A is disposed a sheet, C, preferably also of a translucent material. Upon the sheet C is printed or painted the natural or desired colors of the subject of the picture. The coloring upon this sheet is not visible through the picture when exhibited as above described, the picture in such position being shown in its original or uncolored condition. But when employed as a transparency the coloring is clearly seen, the subject of the picture appearing in natural or desired colors. It will thus be obvious that I have combined in a single article a picture adapted to be exhibited in its original or uncolored condition and also as a tinted transparency. While I prefer to supply the coloring to the sheet C as above described, in some instances it may be desirable to apply the colors directly to the back of the picture, and I therefore reserve the right to such modification.

For the purpose of stiffening the picture and giving the same more body, I prefer to employ a backing-sheet, D of either transparent or translucent material, the said sheet being disposed over the sheet C. The backing may, however, be dispensed with, as shown in Fig. 3. When all the parts have been assembled, a binding-strip, E, is secured around the outer edges, and serves to retain said parts in relative position.

The utility and advantages of my invention will be readily understood by those skilled in the art to which it appertains. Heretofore photographs have been mounted upon glass, and after the paper is removed from the film, the latter is colored, the tinting being at all times seen through the film. But under this practice the glass owing to its fragile nature is liable to be broken and the picture consequently destroyed. Under this process the coloring is also at all times visible, the original uncolored appearance of the photograph being thus destroyed. Transparencies have also been produced employing a semi-transparent or translucent protective sheet of flexible material, the picture being indistinct or obscure except when held to the light, and is therefore not designed or adapted to be exhibited under other conditions. But by the employment of an absolutely transparent protective sheet as in my present invention, in connection with a translucent sheet carrying the picture, the latter is at all times visible; thus, when viewed as an ordinary picture or photograph the original or uncolored effect is presented to view, but when used as a transparency a tinted or colored appearance is the result. The protective sheet being also flexible, damage from breakage as in the case of glass is entirely obviated.

The application of my invention to photographs intended especially for album display is particularly effective. In this case the photograph appears as in its original condition when viewed as ordinarily, but when held to the light the coloring becomes visible and an attractive appearance is thus produced.

Having thus described my invention, I claim—

1. As an improved article of manufacture, an uncolored picture produced upon a sheet of translucent material, and provided with an essentially transparent flexible protective sheet disposed upon its face, said translucent sheet having colors supplied at its rear side and visible only when held to the light; substantially as and for the purpose set forth.

2. As an improved article of manufacture, an uncolored picture produced upon translucent material and provided with a transparent flexible protective sheet upon its face, a backing sheet, and an intermediate sheet of translucent material disposed between the backing sheet and picture and carrying colors or tints upon its front side, said tints or colors being visible only when the picture is held to the light; substantially as and for the purpose set forth.

3. The herein-described method of mounting and treating uncolored pictures consisting in securing to the face thereof by a transparent adhesive a transparent flexible protective sheet, and securing to the back of said picture a sheet provided upon its opposing face with the desired tints or coloring; substantially as and for the purpose set forth.

4. As an improved article of manufacture, an uncolored translucent picture carried by a transparent flexible protective sheet and supplied at its back with coloring visible only when held to the light; substantially as and for the purpose set forth.

In testimony whereof I affix my signature in presence of two witnesses.

JAMES FRANCIS TALLANT.

Witnesses:
B. H. RUTLEDGE,
W. MESSERVY.